(12) United States Patent
Lee et al.

(10) Patent No.: US 11,288,842 B2
(45) Date of Patent: Mar. 29, 2022

(54) METHOD AND SYSTEM FOR RE-PROJECTING AND COMBINING SENSOR DATA FOR VISUALIZATION

(71) Applicant: INTERAPTIX INC., Toronto (CA)

(72) Inventors: Dae Hyun Lee, Toronto (CA); Tyler James Doyle, Toronto (CA)

(73) Assignee: INTERAPTIX INC., Toronto (CA)

( * ) Notice: Subject to any disclaimer, the term of this patent is extended or adjusted under 35 U.S.C. 154(b) by 0 days.

(21) Appl. No.: 16/791,203

(22) Filed: Feb. 14, 2020

(65) Prior Publication Data
US 2020/0265609 A1 Aug. 20, 2020

Related U.S. Application Data

(60) Provisional application No. 62/806,324, filed on Feb. 15, 2019.

(51) Int. Cl.
*G06T 7/80* (2017.01)
*G06T 7/00* (2017.01)
*H04N 17/00* (2006.01)

(52) U.S. Cl.
CPC .................. *G06T 7/80* (2017.01); *G06T 7/97* (2017.01); *H04N 17/002* (2013.01)

(58) Field of Classification Search
CPC .... G06T 7/55; G06T 7/80; G06T 7/97; G06T 2207/30244; G06T 2207/20221; G06T 2200/08; G06T 19/20; G06K 9/209; H04N 17/002
See application file for complete search history.

(56) References Cited

U.S. PATENT DOCUMENTS

| | | | | |
|---|---|---|---|---|
| 8,587,583 B2* | 11/2013 | Newcombe | ............. | G06T 17/00 |
| | | | | 345/420 |
| 9,269,187 B2* | 2/2016 | Chang | ...................... | G06T 7/579 |
| 9,807,365 B2* | 10/2017 | Cansizoglu | .............. | G06K 9/46 |
| 9,858,722 B2* | 1/2018 | Fei | ........................ | G06K 9/0014 |
| 10,003,786 B2* | 6/2018 | Kouperman | ......... | H04N 13/271 |
| 10,375,376 B2* | 8/2019 | Yamamoto | .............. | G06T 7/593 |
| 10,448,000 B2* | 10/2019 | Klusza | ................. | H04N 13/207 |
| 10,600,210 B1* | 3/2020 | Citraro | ................. | G06N 3/0454 |
| 10,628,949 B2* | 4/2020 | Aflalo | .................... | G06T 3/0068 |
| 10,705,217 B2* | 7/2020 | Korkalo | ................. | H04N 5/247 |
| 10,789,752 B2* | 9/2020 | Yu | ........................... | G06T 15/10 |
| 10,848,731 B2* | 11/2020 | Simek | .................. | H04N 5/2258 |
| 10,893,251 B2* | 1/2021 | Koyama | ................... | G06T 7/55 |
| 10,984,583 B2* | 4/2021 | Meilland | ............... | G06T 15/205 |
| 11,094,137 B2* | 8/2021 | Gausebeck | ............. | G06T 17/00 |
| 11,158,056 B2* | 10/2021 | Lukac | ................ | H04N 5/23238 |
| 11,164,394 B2* | 11/2021 | Gausebeck | ........... | G06T 19/006 |
| 2011/0102550 A1* | 5/2011 | Daniel | ...................... | G06T 7/55 |
| | | | | 348/46 |

(Continued)

*Primary Examiner* — Brian P Yenke
(74) *Attorney, Agent, or Firm* — Perry + Currier Inc.

(57) ABSTRACT

There is provided a system and method of re-projecting and combining sensor data of a scene from a plurality of sensors for visualization. The method including: receiving the sensor data from the plurality of sensors; re-projecting the sensor data from each of the sensors into a new viewpoint; localizing each of the re-projected sensor data; combining the localized re-projected sensor data into a combined image; and outputting the combined image. In a particular case, the receiving and re-projecting can be performed locally at each of the sensors.

17 Claims, 12 Drawing Sheets

(56) References Cited

U.S. PATENT DOCUMENTS

| | | | |
|---|---|---|---|
| 2014/0300736 A1* | 10/2014 | Reitinger | G06T 7/80 348/144 |
| 2018/0018787 A1* | 1/2018 | Giancola | G06T 7/55 |
| 2018/0091800 A1* | 3/2018 | Ratcliff | H04N 13/128 |
| 2018/0139431 A1* | 5/2018 | Simek | H04N 5/2258 |
| 2018/0249144 A1* | 8/2018 | Feng | G06T 7/246 |
| 2019/0012840 A1* | 1/2019 | Finman | G06T 19/006 |
| 2019/0188435 A1* | 6/2019 | Davis | G06K 9/3258 |
| 2019/0304170 A1* | 10/2019 | Meilland | G06T 7/74 |
| 2019/0325580 A1* | 10/2019 | Lukac | G06T 7/12 |
| 2020/0005489 A1* | 1/2020 | Kroeger | G06K 9/4604 |
| 2020/0011668 A1* | 1/2020 | Derhy | G01C 21/16 |
| 2020/0098164 A1* | 3/2020 | Bruns | G06T 15/10 |
| 2020/0258257 A1* | 8/2020 | Shimoyama | G01B 11/00 |
| 2020/0273200 A1* | 8/2020 | Ellwein | G06T 7/80 |
| 2020/0288102 A1* | 9/2020 | Um | G06T 15/205 |
| 2021/0082147 A1* | 3/2021 | Drejak | G06T 7/13 |
| 2021/0105593 A1* | 4/2021 | Hu | G01S 19/485 |
| 2021/0136342 A1* | 5/2021 | Bina | H04N 21/4223 |
| 2021/0166428 A1* | 6/2021 | Kehl | G06T 7/97 |
| 2021/0279957 A1* | 9/2021 | Eder | G06K 9/00624 |

\* cited by examiner

METHOD AND SYSTEM FOR RE-PROJECTING AND COMBINING SENSOR DATA FOR VISUALIZATION

TECHNICAL FIELD

The following relates generally to image processing, and more specifically, to a method and system for re-projecting and combining sensor data for visualization.

BACKGROUND

Various applications use multiple cameras to visualize an environment. In an example, cameras are installed at various locations in a shopping mall, so that security personnel can monitor camera views of the mall from a remote location. In another example, aerial drones can be equipped with cameras to image the terrain below. In another example, some mapping applications use a top-down or "bird's eye view" to help visualize, localize, and understand the environment.

However, in many applications, such as the above examples, viewpoints provided by separate cameras can differ from each other. For example, security cameras are often mounted at different heights and angles, where a set of discrete video feeds is typically displayed to an operator as a bank of displays. In order to maintain situational awareness of events occurring in the environment, these viewpoints must be mentally integrated by the operator. Understanding the spatial relationships between camera angles can be difficult, and tracking of objects across the different views can be challenging. Furthermore, the coverage from the collective set of cameras may have "blindspots", where areas of the environment are not covered by any camera's field of view; potentially resulting in important events being missed. While wide angle cameras can provide a greater scope of coverage, they generally have a distorted image that is difficult for an operator to interpret.

SUMMARY

In an aspect, there is provided a computer-implemented method of re-projecting and combining sensor data of a scene from a plurality of sensors for visualization, the method comprising: receiving the sensor data from the plurality of sensors; re-projecting the sensor data from each of the sensors into a new viewpoint; localizing each of the re-projected sensor data; combining the localized re-projected sensor data into a combined image; and outputting the combined image.

In a particular case of the method, the sensor data comprises red-green-blue-depth (RGB-D) channel values for each of a plurality of pixels.

In another case of the method, the values of the RGB-D channels are from a combination of two or more sensors.

In yet another case of the method, re-projecting the sensor data comprises: calibrating each of the sensors to determine one or more calibration values for the respective sensor; generating a point cloud for the respective sensor by applying the calibration values to each of the depth D channel values for each pixel; and applying a matrix representative of the new viewpoint to the point cloud for each sensor.

In yet another case of the method, calibrating each of the sensors comprises determining intrinsic parameters for each of the sensors, the intrinsic parameters comprising distortions and camera matrix.

In yet another case of the method, the localization comprises performing simultaneous localization and mapping (SLAM) to position and orient the re-projected sensor data relative to each other.

In yet another case of the method, simultaneous localization and mapping comprises performing point-to-plane iterative closest point.

In yet another case of the method, the method further comprises adding supporting elements to the combined image.

In yet another case of the method, the support elements comprise graphical elements associated with one or more objects located in the scene.

In yet another case of the method, the combined image comprises a top-down view.

In another aspect, there is provided a system for re-projecting and combining sensor data of a scene from a plurality of sensors for visualization, the system comprising one or more processors and one or more data storages, the one or more processors in communication with the one or more data storages and configured to execute: an input module to receive the sensor data from the plurality of sensors; a projection module to re-project the sensor data from each of the sensors into a new viewpoint; a localization module to localize each of the re-projected sensor data; a combination module to combine the localized re-projected sensor data into a combined image; and an output module to output the combined image.

In a particular case of the system, one or more of the processors and one or more of the data storages are distributed and local to one or more of the sensors, and wherein the distributed one or more processors are configured to execute at least the input module and the projection module.

In another case of the system, the sensor data comprises red-green-blue-depth (RGB-D) channel values for each of a plurality of pixels.

In yet another case of the system, the values of the RGB-D channels are from a combination of two or more sensors.

In yet another case of the system, re-projecting the sensor data comprises: calibrating each of the sensors to determine one or more calibration values for the respective sensor; generating a point cloud for the respective sensor by applying the calibration values to each of the depth D channel values for each pixel; applying a matrix representative of the new viewpoint to the point cloud for each sensor.

In yet another case of the system, calibrating each of the sensors comprises determining intrinsic parameters for each of the sensors, the intrinsic parameters comprising distortions and camera matrix.

In yet another case of the system, the localization comprises performing simultaneous localization and mapping (SLAM) to position and orient the re-projected sensor data relative to each other.

In yet another case of the system, the system further comprises a support module to add supporting elements to the combined image.

In yet another case of the system, the support elements comprise graphical elements associated with one or more objects located in the scene.

In yet another case of the system, the combined image comprises a top-down view.

These and other aspects are contemplated and described herein. It will be appreciated that the foregoing summary sets out representative aspects of various embodiments to assist skilled readers in understanding the following detailed description.

BRIEF DESCRIPTION OF THE DRAWINGS

A greater understanding of the embodiments will be had with reference to the Figures, in which.

DETAILED DESCRIPTION

Figure 1:
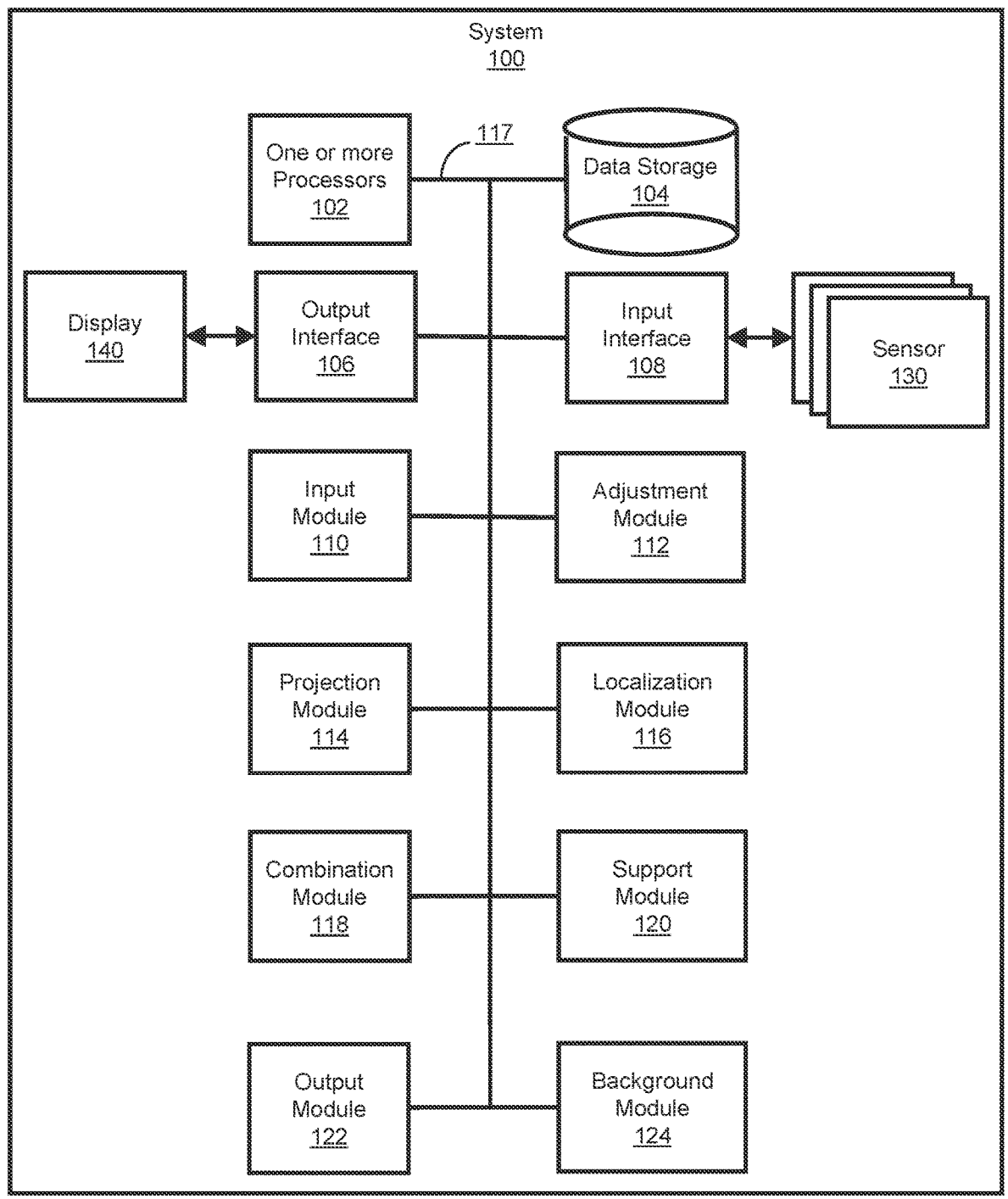
FIG. 1 is diagram illustrating a system for re-projecting camera images for visualization, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to image processing, and more specifically, to a method and system for re-projecting and combining sensor data for visualization.

Embodiments of the present disclosure can advantageously use a re-projected viewpoint from one or more cameras to enable efficient viewing and/or interaction with the re-projected view. In some cases, such efficient viewing and/or interaction can include other digital media overlaid on the view. In some cases, the images received from the camera or cameras can be used in combination with various sensors that provide information about the environment. Advantageously, such embodiments can afford better situational awareness of events in an environment while also presenting a number of opportunities for analyzing and interacting with objects in the re-projected view.

Referring now to FIG. 1, a system 100 for re-projecting and combining sensor data for visualization, in accordance with an embodiment, is shown. As understood by a person skilled in the art, in some cases, some components of the system 100 can be executed on separate hardware implementations. In other cases, some components of the system 100 can be implemented on one or more processors that may be locally or remotely distributed.

FIG. 1 shows various physical and logical components of an embodiment of the system 100. As shown, the system 100 has a number of physical and logical components, including one or more processors 102, data storage 104, an output interface 106, an input interface 108, and a local bus 117 enabling the components to communicate with each other. The system 100 also includes a number of functional modules to be executed on the one or more processors 102; for example, an input module 110, an adjustment module 112, a projection module 114, a localization module 116, a combination module 118, a support module 120, an output module 122, and a background module 124. In other embodiments, the modules can be implemented in specific hardware or via a dedicated processor. In some cases, the modules can be combined, separated into more modules, or implemented on remote systems. The output interface 106 enables the system 100 to communicate with output devices, such as a display device 140 or speakers. The input interface 108 enables the system 100 to communicate with input devices, such as sensors 130, and user input devices (e.g., mouse, touchscreen, and the like). The sensors 130 and the display device 140 can be connected to the system over wired connections, wireless connections, or over a network (such as over the internet).

The sensors 130 can capture optical images and/or other data from the environment. In some cases, the sensor 130 can be a combination of sensors and devices; for example, a combination optical camera and depth sensor such as an Intel RealSense™ Depth Camera D435. But it will be understood that the sensors 130 can be any suitable sensor or combination of sensors; for example, optical cameras, laser rangefinders, Lidar, and light-field cameras. In some cases, the output from the sensors can be a red-green-blue-depth (RGB-D) image, where each pixel has a value associated with each RGB-D channel. In some cases, the values from one or more of the RGB-D channels can be a combination of two or more sensors 130. The sensors 130 can include devices that use range imaging techniques; for example, stereo triangulation, sheet of light triangulation, structured light, time-of-flight, interferometry, and coded aperture. The captured sensor data may be from a stationary sensor (for example, from a sensor mounted on a wall or on a tripod), a handheld sensor that is moving (for example, from a smartphone), a head worn sensor (for example, Snap Spectacles™, Google Glass™, Magic Leap One™), or mounted on a moving device or platform (for example, on a dolly track, robotic platform, robotic arm, camera harness).

The display device 140 can be used to display combined re-projected images and data, as described herein. In an example, the re-projected images can be displayed on a display device 140 consisting of a computer monitor. However, any suitable display device, or combination of devices, can be used; for example, a stereoscopic head-mounted display (for example, Microsoft Hololens™, Magic Leap One™, Metavision Meta 2™), a pair of smartglasses (for example, RealWear HMT™, Vuzix Blade™, Epson Moverio™), a heads-up display (for example, Garmin HUD™, Rockwell Collins HUD™), a computer tablet (for example, an Apple iPad™), a smartphone (for example, a Samsung Galaxy™), a smartwatch (for example, an Apple Watch™), a laptop, a television, or a projector.

The data storage 104 can be used to store sensor data, including images, and to store other data. In an example, the data storage 104 can be located locally, such as on a local server. However, it will be understood that the data storage 104 can be any suitable storage device, or combination of devices, such as a local storage on a local device (for example, hard drive or memory card), on a server (for example, a computer server or network access storage), or over a network such as using a cloud-based storage (for example, Amazon™ Cloud Services).

In some embodiments, the system 100 can have a distributed architecture, where the one or more processors are located on a server and communicates with sensor 130, which has its own processing capability. Such communication can include requests to receive sensor data (such as image segments) that are required to generate a combined view; such as a single top-down view or a synthesized view. In some cases, the server can communicate the required resolution and the perspective for each camera in real time.

Figure 2:
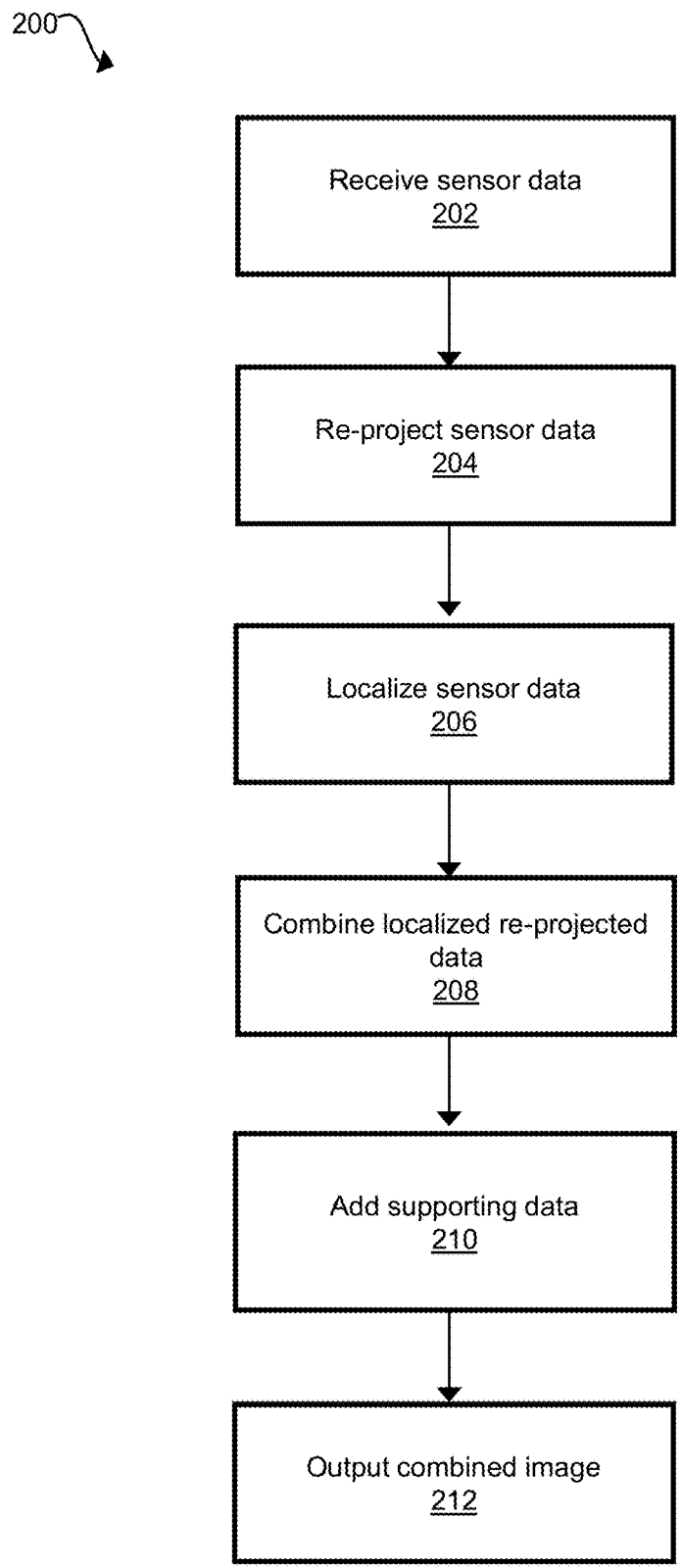
FIG. 2 is a flow chart illustrating a method for re-projecting camera images for visualization, in accordance with an embodiment.

Referring now to FIG. 2, a method 200 for re-projecting and combining sensor data for visualization, in accordance with an embodiment, is shown. At block 202, the input module 110, via the input interface 108, receives sensor data from the plurality of sensors 130. In an example diagrammatically illustrated in FIG. 3, the sensors 130 can be CCTV cameras 13, 14, 15, 16 each providing captured images as the sensor data. In some cases, the sensor data from the cameras 13, 14, 15, 16 can be digital signals. In other cases, the sensor data from the cameras 13, 14, 15, 16 can be analog signals that can be converted by the input interface 108 to digital representations. In this example, for the purposes of illustration, the cameras 13, 14, 15, 16 can also be color cameras, with reasonably high resolution (such as 720P), and a reasonably wide field of view (such as 60 degrees). In most cases, it is not required that the cameras 13, 14, 15, 16 have the same resolution, are all either color or black-and-white, or all have the same field of view. In some cases, the images received from the cameras can be adjusted by the adjustment module 112; for example, via resizing, scaling, filtering, rotation, cropping, background subtraction, object detection and tracking, and/or machine learning techniques.

Figure 3:
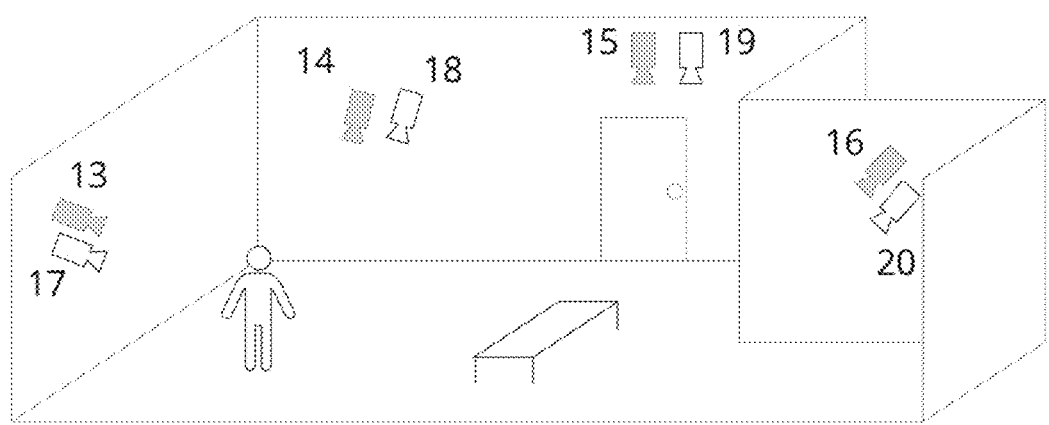
FIG. 3 illustrates an example of a room outfitted with multiple sensors at different locations.

In the example of FIG. 3, the sensors 130 can also be depth sensors 17, 18, 19, 20. In most cases, the depth sensors 17, 18, 19, 20 have a reasonable depth field of view that is similar or close to the field of view of the cameras 13, 14, 15, 16, such as 60 degrees, to adequately cover the area. However, it is not required that the field of view of the cameras 13, 14, 15, 16 and depth sensors 17, 18, 19, 20 be the same. In most cases, a depth range of the depth sensors 17, 18, 19, 20 will be at least as long as the distance between the cameras 13, 14, 15, 16 and any objects and/or structures that are required to be captured. However, additional cameras and/or depth sensors can be added to adequately cover the area.

Figure 4:
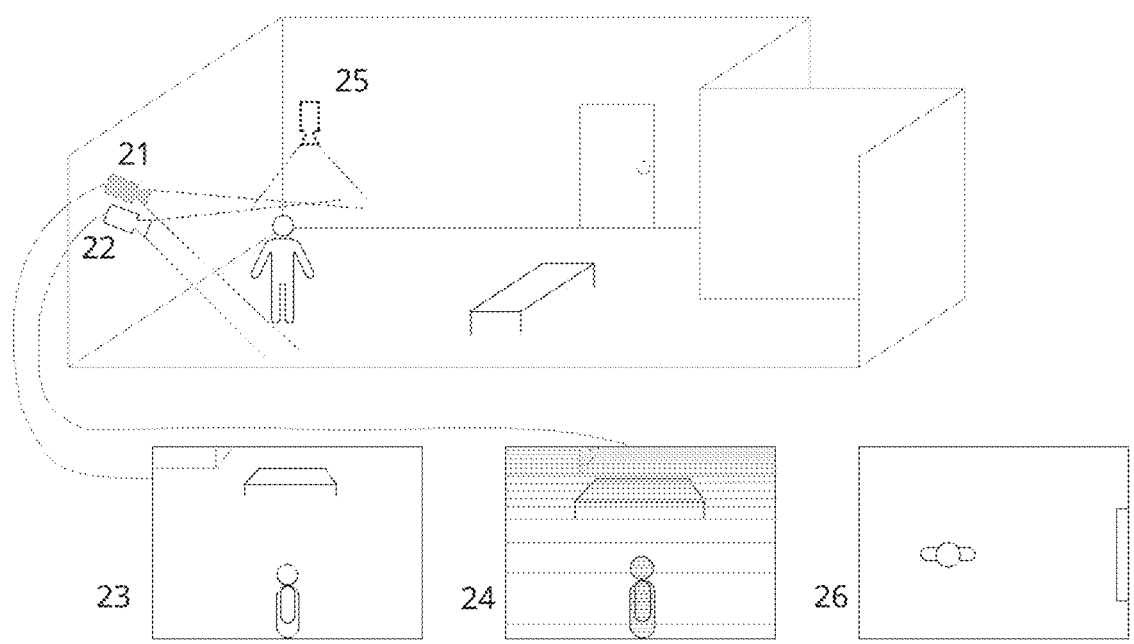
FIG. 4 illustrates an example of sensor data provided by a camera and depth sensor, as well as a re-projected top-down viewpoint, in accordance with the system of FIG. 1.

At block 204, the projection module 114 processes and re-projects the received sensor data into a new viewpoint. In an example diagrammatically illustrated in FIG. 4, image data from camera 21 shown in view 23 and the depth data from sensor 22 shown in view 24 are combined and re-projected by the projection module 114 using point cloud re-projection. In this example, the localization module 116 estimates a projection matrix of each of the sensors 130 in relation to virtual world coordinates representative of the captured area. The projection module 114 generates a 3D representation using the RGB-D image data from the sensors 130. The projection module 114 re-projects using a matrix for each camera that represents a view that generates a 2D view. Any suitable re-projection approach can be used to re-project to a new viewpoint; for example, image warping or machine learning techniques. As illustrated, in an example, the projection module 114 can generate a re-projected top-down virtual viewpoint 25, shown as view 26. However, note that any viewpoint could be generated, such as an isometric viewpoint, and at any distance from the area or objects. Also, it is understood that the viewpoint could be changing over time, including in pre-defined trajectories, manually, and/or to follow an object or person as they move through the area.

In an example, the projection module 114 can perform re-projection by calibrating the sensors to determine their intrinsic parameters; the intrinsic parameters can include distortions and camera matrix. This calibration can be for each sensor or just for each sensor-type, as the case may be. Calibration can be used to account for distortions of the sensors, such as radial distortion and tangential distortion in captured images. In an example calibration, suitable libraries (for example, OpenCV) can be used for calibration by using an image of a chess board placed at different locations and orientations. he calibration can then be used to find the corners of the chess board then recognize the chess board pattern. The calibration can then return various calibration values, such as, sensor matrix, distortion coefficients, rotation and translation vectors, and the like.

With the above values, an undistorted image can be determined; such as by determining a region of interest and cropping to find an undistorted image or determining a mapping function from the original image to an undistorted image. In a particular case, Perspective-n-Point calibration can be performed using the checkerboard board located on a floor. This allows the projection module 114 to determine each camera position relative to the checkerboard placed on the ground. It will be appreciated that the above is an example calibration and any suitable calibration approach can be used.

In an example, the projection module 114 can perform re-projecting using a generated point cloud. The point cloud can be generated from the D channel values of the RGB-D images from the sensors 130 by applying the calibration to each of the pixel values of the D channel; for example, via applying a matrix multiplication. A re-projected viewpoint can have an extrinsic matrix representative of the location and rotation/direction of the re-projected (new) viewpoint, which is applied to the generated point clouds to generate a view from the re-projected perspective; for example, rendering each point in the cloud as a small surfel (surface element) or sphere. In an example, the re-projected view can be formed by projecting 3D points into the image plane using a perspective transformation; such as:

$$sm' = A[R|t]M'$$

where s is a skew coefficient; m' are coordinates of the re-projected points; and [R|t] is a joint rotation-translation matrix (the matrix of extrinsic parameters received from the calibration) that translates coordinates of a point in matrix M' to a coordinate system represented by matrix A that is a camera matrix (or a matrix of intrinsic parameters).

In further cases, other approaches to re-projecting can be used; for example, using image warping (view interpolation) or machine learning techniques (for example, using an artificial neural network such as a generative query network (GQN)). In further cases, the point cloud can be received from the sensor 130 itself.

Figure 5:
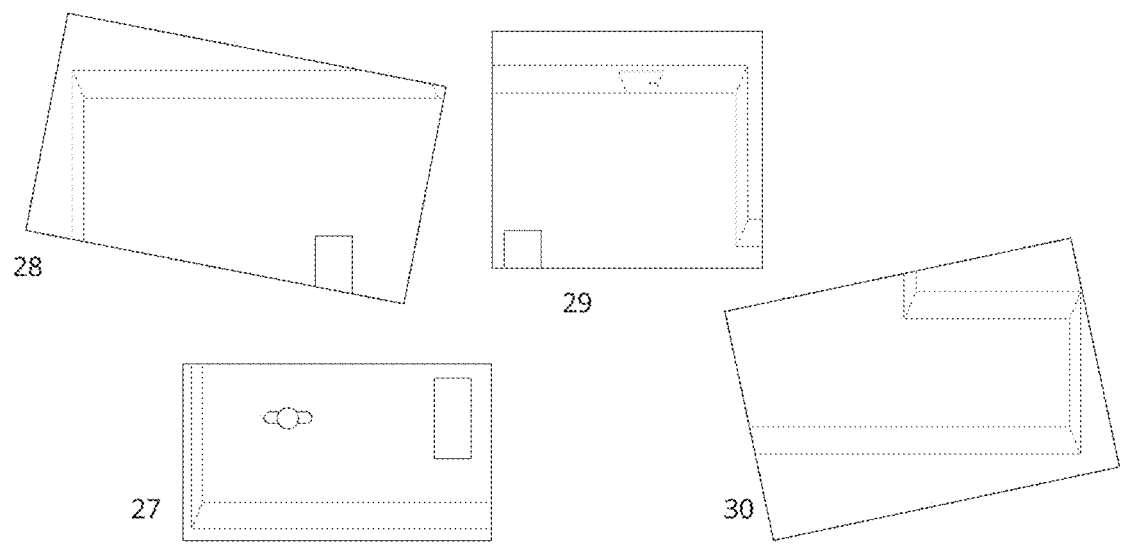
FIG. 5 illustrates an example of multiple re-projected top-down views that are localized to each other, in accordance with the system of FIG. 1.

At block 206, the localization module 116 localizes images of the re-projected sensor data relative to each other. In an example diagrammatically illustrated in FIG. 5, a simultaneous localization and mapping (SLAM) approach can be used to position and orient the re-projected images 27, 28, 29, 30 relative to each other. As an example, a point-to-plane iterative closest point (ICP) approach can be used against a point cloud generated from the SLAM approach; where a transformation is determined that roughly aligns point clouds from two or more cameras. In an example of the ICP approach, the localization module 116 determines a correspondence set K={(p,q)} from a point cloud from a first camera P, and a point cloud from a second camera Q, transformed using a transformation matrix T. The transformation T can be updated from an initial value by minimizing an objective function E(T) defined over the correspondence set K. The objective function being:

$$E(T) = \sum_{(p,q) \in K} ((p - Tq) \cdot n_p)^2$$

where $n_p$ is the normal of point p.

In another example, the localization module 116 can perform localization using ORB-SLAM. ORB-SLAM uses ORB features to determine location. ORB-SLAM achieves tracking, mapping, relocalization and loop closing by maintaining a graph of key frames. In an example of the ORB-SLAM approach, the localization module 116 treats images from the sensors 130 as key frames to identify the pose relative to the SLAM's coordinate system. It should be noted that when using a different type of camera to perform the SLAM, the difference in the intrinsics should be taken into account. Generally, ORB-SLAM is performed using three threads: a tracking thread, a local mapping thread and a loop closing thread. The tracking thread localizes each camera, for example as described herein, and matches features with a previous frame. The local mapping thread inserts keyframes into a covisibility graph, with a spanning tree linking keyframe to keyframe having the most points in common. New map points are created by triangulating ORB features from connected keyframes in the covisibility graph. The loop closing thread is used to detect possible loops by checking similarity of keyframes to its neighbors in the covisibitlity graph.

It is understood that any suitable approach, or combination of approaches, can be used to localize the images; for example, using known relative positions and orientations of the cameras to manually align the images relative to each other.

Figure 6:
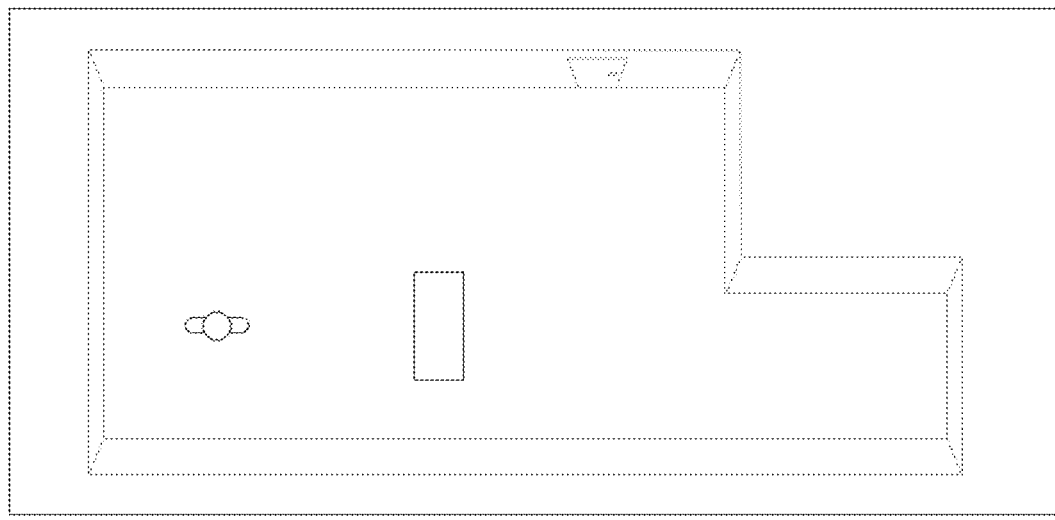
FIG. 6 illustrates an example of a re-projected top-down view after combining the re-projected images of FIG. 5, in accordance with the system of FIG. 1.

At block 208, the combination module 118 combines the images of the localized re-projected sensor data into a combined image. FIG. 6 illustrates an example of such combination for the images of the example of FIG. 5. In further cases, image stitching can be used to form a single image 31 of the area covered by the cameras. In some cases, the images can be updated in real-time, providing a live top-down video feed of the covered area. However, in other cases, portions of the image 31 can be updated at different time intervals. For example, portions of the image 31 could be updated synchronously or asynchronously with each other, and at various times, including at fixed intervals or manually. It is also understood that portions of the images may not be updated over time. In an example, some cameras can send new images (frames) only when a motion sensor associated with the area captured by such cameras detects movement.

Figure 7:
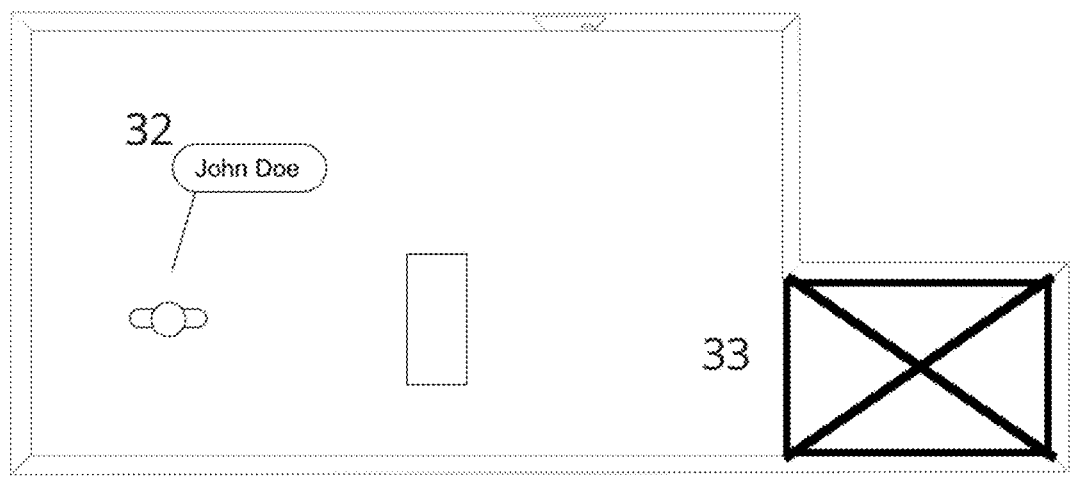
FIG. 7 illustrates an example of the combined image of FIG. 6 with supporting information overlaid, in accordance with the system of FIG. 1.

In some cases, at block 210, the support module 120 can add supporting elements to the combined image. FIG. 7 illustrates an example of adding such supporting elements to the example of FIG. 6. In this example, a graphical element 32 is displayed as a person's name, next to the person as they move around the area covered by the cameras, as well as graphical element 32 used to denote an area that is off limits to the person in the area. In some cases, a machine learning computer vision technique (such as a convolutional neural network) can be used to perform detection of the person (for example, using facial recognition, posture recognition, or the like). It is understood that any suitable element or combination of elements may be added; for example, personalized information linked to the people and/or objects in the area, highlighting objects and/or areas, and heatmaps and/or information related to the ensemble of objects in the area. Supporting elements may also be auditory; for example, audio cues outputted to an audio output device when a person enters a restricted area.

At block 212, the output module 122 can output the combined image; for example, to the data storage 104 and/or the display 140 via the output interface 106.

In another embodiment, the system 100 can use background subtraction to combine the images. In this way, the background of one or more of the sensor 130 images remains static while people or other foreground objects are updated against the background; for example, in real-time. This approach can advantageously be used to make the overall rendering appear more stable. This has a particular benefit when the sensor's noise affects the re-projected image. Additionally, when there is generally no requirement to focus, a complete static background can make it easier to distinguish moving objects. Additionally, moving objects are detected and separated from the background, which allows for the capability to highlight the moving object(s) in the scene; for example, via changing the color of the moving object(s) or otherwise annotating or highlighting the moving object(s).

Figure 12:
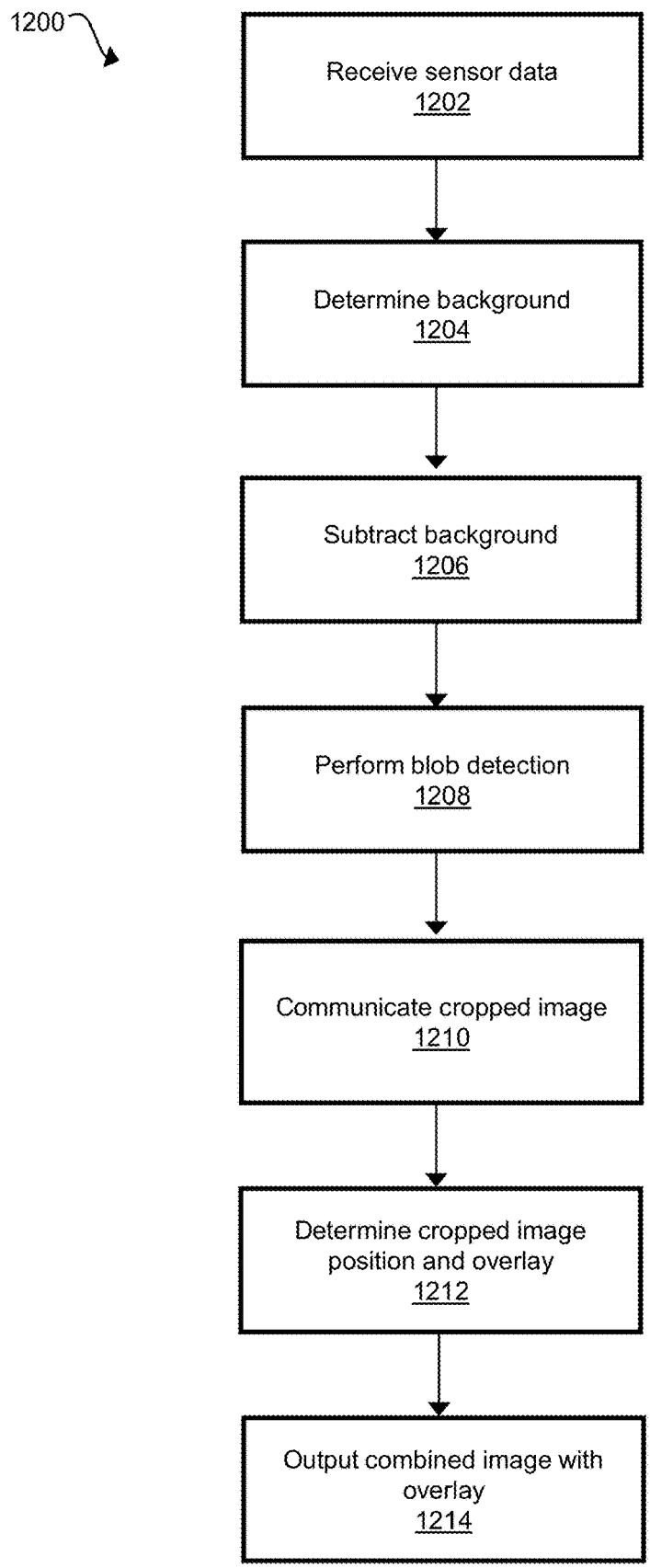
FIG. 12 illustrates a flowchart for a further embodiment of a method for re-projecting and combining sensor data for visualization.

FIG. 12 illustrates a flowchart for the above embodiment of a method for re-projecting and combining sensor data for visualization 1200. In some cases, the system 100 generates the combined image, as described in the above method 200, as a static background image. In further cases, previously received static combined images or blueprint/CAD images can be used as the background image. Then, at block 1202, the input module 110, via the input interface 108, receives further sensor data from the plurality of sensors 130. The sensor data includes images and depth information. At block 1204, the background module 124 determines the background for each image. The background can be determined using any suitable approach; for example, re-projecting without the D depth information, with a checkerboard with a known grid size using the perspective-n-point approach. This can morph the image to a plane. In another example, the background can be determined by smoothing noise by averaging multiple frames of the depth sensor readings to create a smoothed depth map. This can generate a static background image with reduced noise.

At block 1206, the background module 124 subtracts the background from the sensor data from each sensor 130. Any suitable background subtraction approach can be used; for example, GMG, MOG, MOG2, KNN, CNT, and the like.

Figure 13:
FIG. 13 illustrates an example of a cropped image in accordance with the system of FIG. 1.

At block 1208, the background module 124 performs a blob detection on the images that have their background subtracted; for example, using Laplacian of Gaussian (LoG), Difference of Gaussians (DoG), Determinant of Hessian (DoH), Maximally stable extremal regions, principal curvature-based region detector (PCBR), and the like. From the blob detection, the background module 124 determines a cropped image, for each image in the sensor data, comprising the detected blob with the background subtracted. FIG. 13 illustrates a cropped image with a detected blob according to an example experiment.

At block 1210, the background module 124 communicates the cropped image with the background subtracted to the projection module 114, and in some cases, along with cropping information (for example, the four corners in the sensor's local space).

At block 1212, the projection module 114 determines the cropped image's position with respect to the combined view, using the cropping information for the respective sensor 130, and overlays it on-top of the static background combined image.

At block 1214, the output module 122 outputs the combined image with the cropped image overlaid.

In some cases, the static combined background image can be updated periodically with some appropriate predetermined frequency (for example, every 10 seconds).

Figure 8:
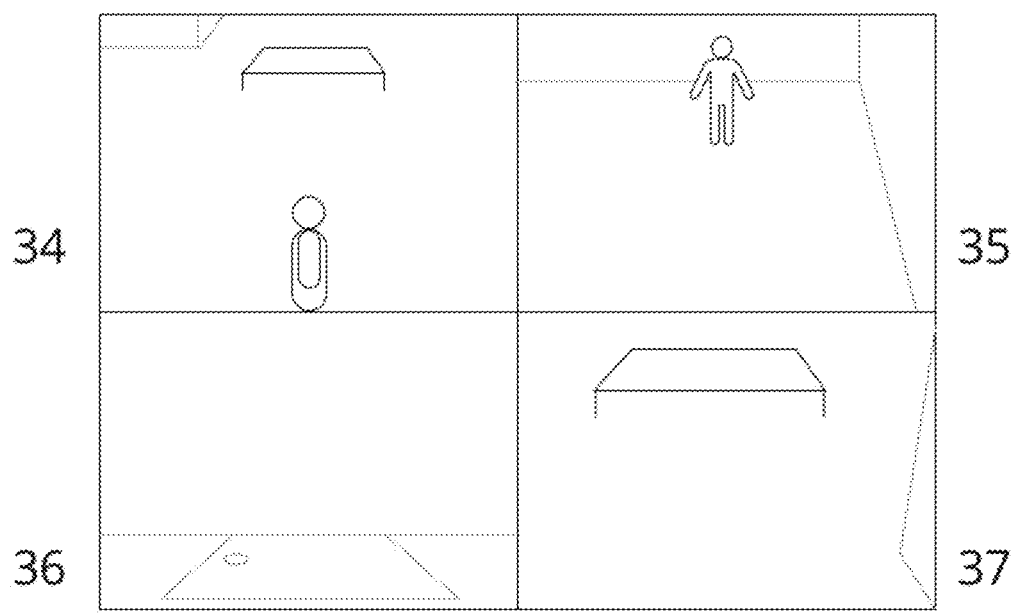
FIG. 8 illustrates an example of a bank of displays to provide security coverage of an area.

The present embodiments can be used in a number of applications. In an example, the present embodiments can be used in a security system for a room, as illustrated in FIGS. 3 to 7, including a number of cameras in various locations of the room. In previous approaches, as illustrated in the example of FIG. 8, a security guard would be presented with a bank of video displays showing multiple video feeds 34, 35, 36, 37. In contrast, with the present embodiments, the images from the security cameras can be re-projected and combined into a single video feed; for example as illustrated in FIG. 6, which displays a top-down, "bird's eye view" showing all of the cameras feeds on a single large television. In these cases, the video feed can be updated in real-time. In this example application, the support module 120 can track movements of individual objects or people in the video feed, allowing for better situational awareness as individuals or objects move through the scene. Also in this example application, the support module 120 can display a recent history of objects' locations as a color-coded "heat map". Also in this example application, the support module 120 can record and analyze movement of individuals for understanding foot traffic or car traffic flow during busy periods of the day, month, or year. Also in this example application, the support module 120 can use information from other sources to annotate the combined image with relevant information about the objects or individuals. For example, an identified individual could have their name displayed next to them in the video feed. Also in this example application, the support module 120 can use information from facial features of an individual in the area; allowing the viewpoint to be manipulated to show an isometric view. In this case, other individuals who are not being tracked can be removed from the video feed, to better focus on a subject individual.

Figure 9:
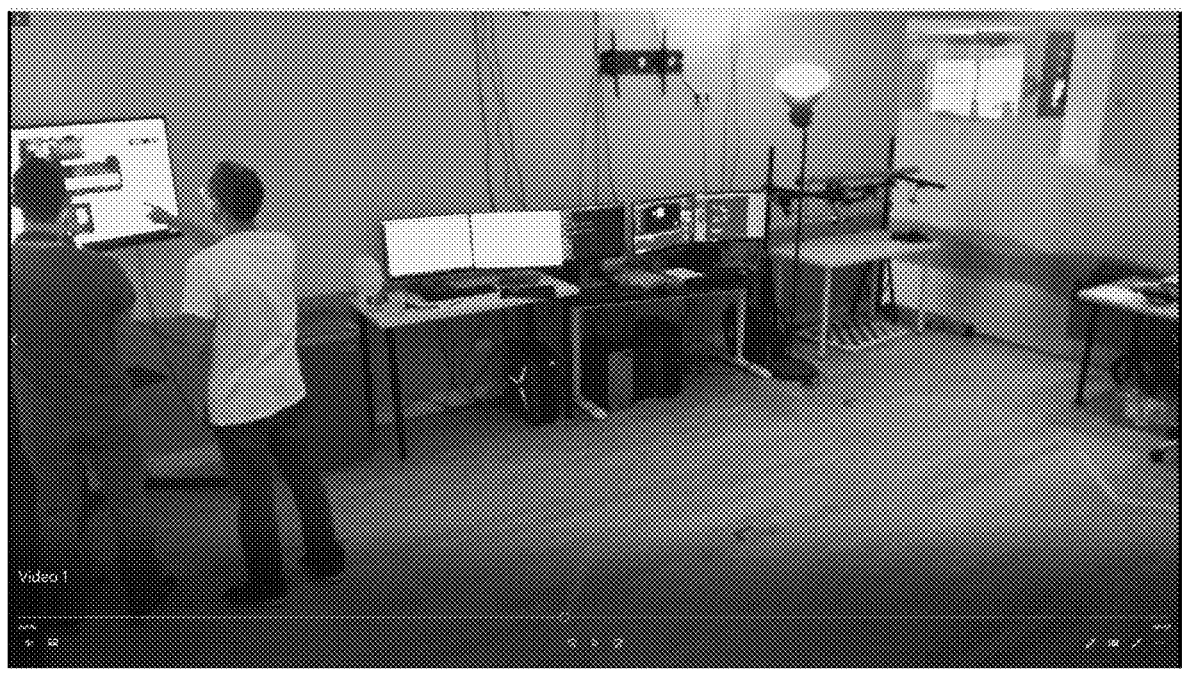
FIG. 9 illustrates a view from a sensor in an example implementation, in accordance with the system of FIG. 1.
Figure 10:
FIG. 10 illustrates a combined top-down view for the example implementation of FIG. 9, in accordance with the system of FIG. 1.
Figure 11:
FIG. 11 illustrates a zoomed-in portion of the top-down view of FIG. 10 for the example implementation, in accordance with the system of FIG. 1.

FIGS. 9, 10, and 11 illustrate an example experiment using the system 100. In this example, as illustrated in FIG. 10, a top-down view of an area is displayed. The top-down view includes a number of views from sensors 130 combined together. FIG. 9 illustrates one such sensor 130 view, capturing two persons in a region of the area from a sensor 130 at an isometric viewpoint. As illustrated in FIG. 11, which is a zoomed-in view of the dashed-line box in FIG. 10, the view in FIG. 9 is re-projected and localized to be combined into the top-down view; such that the two persons are now displayed from the re-projected viewpoint.

In another example application, the present embodiments can be used in an industrial warehouse setting. In this example, a worker could be walking in the environment, viewing the live top-down video (for example, on a smartphone or smart-glasses). This would enable a number of uses. For example, the worker can be provided instructions annotated on the top-down view on how to reach a certain location. In such an example, the top-down view may remain in a "North up" orientation (displaying North as being up on the display), or continually rotate "Track-up" (to ensure that the forward facing direction is always facing up in the display). In another example use, areas that should not be accessed by the worker, based on, for example, security clearance or hazards, can be marked as such on the top-down view. The worker can be alerted when he enters the restricted area. In another example use, potential hazards, such as forklifts, that are moving towards the individuals can be highlighted and the worker can be notified.

In some embodiments, as part of the system 100, one or more of the processors 102 and further data storages 104 can be distributed, such as being local to one or more of the sensors 130. In this way, these local components can perform decoding and other initial processing, and in some cases, can perform the re-projection. In this embodiment, a centralized computing device comprising the one or more processors 102 can be responsible for generating the combined view. This is advantageous, as in some circumstances, processing all the RGB-D data at a centralized computing device may not be feasible due to the large amounts of data to stream and process.

The embodiments described herein can advantageously be used to lower the cognitive load on users by combining the multiple views because the users would otherwise have to mentally combine multiple views into spatial information. In an environment where there are many camera feeds like surveillance cameras, significant cognitive overhead is required to understand where the camera feed is coming from. Such cognitive load that is relieved includes knowing whether and where there are blind spots in camera configuration and which camera feed to look next when tracking a person in the camera feed. Additionally, such user would otherwise have to go back and forth between a top-down view and camera views, forcing the user to develop suboptimal cognitive and perceptual strategies in attending to the various views.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method of re-projecting and combining sensor data of a scene from a plurality of sensors for visualization, the method comprising:
    receiving the sensor data from the plurality of sensors, wherein the sensor data comprises red-green-blue-depth (RGB-D) channel values for each of a plurality of pixels, and wherein the values of the RGB-D channels are from a combination of two or more sensors;
    re-projecting the sensor data from each of the sensors into a new viewpoint by:
        calibrating each of the sensors to determine one or more calibration values for the respective sensor;
        generating a point cloud for the respective sensor by applying the calibration values to the depth D channel values for each pixel; and
        applying a matrix representative of the new viewpoint to the point cloud for each sensor;
    localizing each of the re-projected sensor data;
    combining the localized re-projected sensor data into a combined image; and
    outputting the combined image.

2. The method of claim 1, wherein calibrating each of the sensors comprises determining intrinsic parameters for each of the sensors, the intrinsic parameters comprising distortions and camera matrix.

3. The method of claim 1, wherein the localization comprises performing simultaneous localization and mapping (SLAM) to position and orient the re-projected sensor data relative to each other.

4. The method of claim 3, wherein simultaneous localization and mapping comprises performing point-to-plane iterative closest point.

5. The method of claim 1, further comprising adding supporting elements to the combined image.

6. The method of claim 5, wherein the supporting elements comprise graphical elements associated with one or more objects located in the scene.

7. The method of claim 1, wherein the combined image comprises a top-down view.

8. A system for re-projecting and combining sensor data of a scene from a plurality of sensors for visualization, the system comprising one or more processors and one or more data storages, the one or more processors in communication with the one or more data storages and configured to execute:
    an input module to receive the sensor data from the plurality of sensors;
    a projection module to re-project the sensor data from each of the sensors into a new viewpoint;
    a localization module to localize each of the re-projected sensor data;
    a combination module to combine the localized re-projected sensor data into a combined image; and
    an output module to output the combined image.

9. The system of claim 8, wherein one or more of the processors and one or more of the data storages are distributed and local to one or more of the sensors, and wherein the distributed one or more processors are configured to execute at least the input module and the projection module.

10. The system of claim 8, wherein the sensor data comprises red-green-blue-depth (RGB-D) channel values for each of a plurality of pixels.

11. The system of claim 10, wherein the values of the RGB-D channels are from a combination of two or more sensors.

12. The system of claim 11, wherein re-projecting the sensor data comprises:
    calibrating each of the sensors to determine one or more calibration values for the respective sensor;
    generating a point cloud for the respective sensor by applying the calibration values to each of the depth D channel values for each pixel; and
    applying a matrix representative of the new viewpoint to the point cloud for each sensor.

13. The system of claim 12, wherein calibrating each of the sensors comprises determining intrinsic parameters for each of the sensors, the intrinsic parameters comprising distortions and camera matrix.

14. The system of claim 8, wherein the localization comprises performing simultaneous localization and mapping (SLAM) to position and orient the re-projected sensor data relative to each other.

15. The system of claim 8, further comprising a support module to add supporting elements to the combined image.

16. The system of claim 15, wherein the supporting elements comprise graphical elements associated with one or more objects located in the scene.

17. The system of claim 8, wherein the combined image comprises a top-down view.

* * * * *